United States Patent [19]
Rosenquist

[11] Patent Number: 5,801,303
[45] Date of Patent: Sep. 1, 1998

[54] METHOD AND GAUGE FOR CORRECTLY REASSEMBLING A V-ENGINE

[75] Inventor: Gerald A. Rosenquist, Lake Zurich, Ill.

[73] Assignee: Fel-Pro Incorporated, Skokie, Ill.

[21] Appl. No.: 749,787

[22] Filed: Nov. 15, 1996

[51] Int. Cl.[6] .................... G01M 15/00; G01B 3/56; G01B 5/224
[52] U.S. Cl. .................... 73/119 R; 33/533; 33/600
[58] Field of Search .................... 73/118.1, 119 R, 73/116, 865.8; 33/533, 600, 606, 608

[56] References Cited

U.S. PATENT DOCUMENTS 5,033,292 7/1991 Dennis .................... 73/118.1
5,569,846 10/1996 Grenkowitz et al. .................... 73/119 R X

OTHER PUBLICATIONS

BHJ Products Inc. of Newark, California catalog cover page and p. 22 "Model VT–4 Cylinder Head Intake Angle Level" published by Nov. 14, 1995.

Primary Examiner—Thomas P. Noland
Attorney, Agent, or Firm—Steven P. Shurtz; Brinks Hofer Gilson & Lione

[57] ABSTRACT

A gauge and method for reestablishing the designed relationships between the block, heads and intake manifold of a V-engine after it has been disassembled for refinishing. The angular relationship between the surfaces of the heads is ascertained to determine if they are correctly oriented prior to final assembly with the intake manifold.

4 Claims, 3 Drawing Sheets

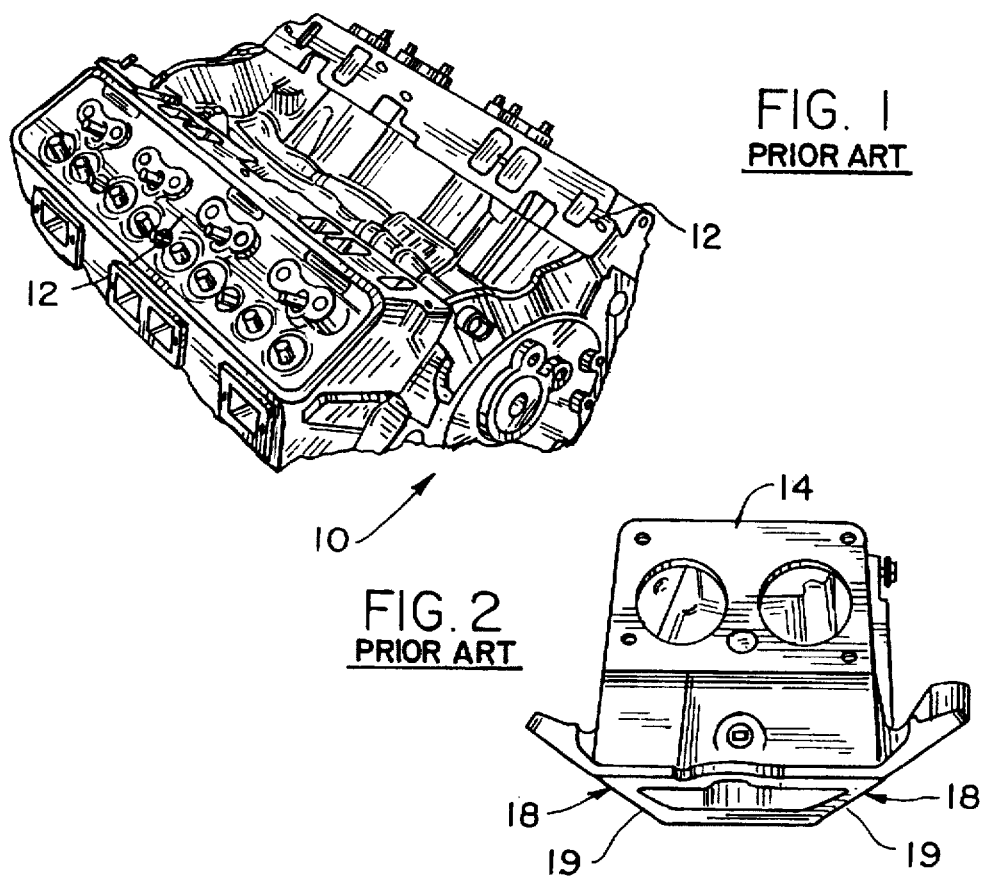
FIG. 1 PRIOR ART
FIG. 2 PRIOR ART
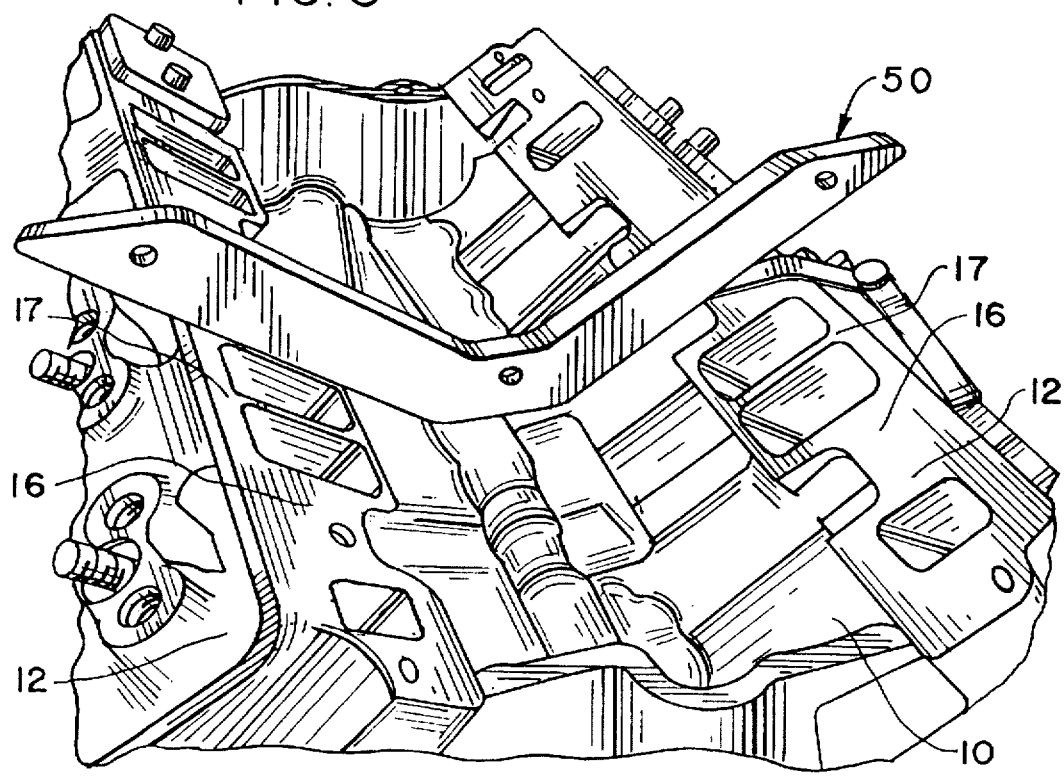
FIG. 3

1

METHOD AND GAUGE FOR CORRECTLY REASSEMBLING A V-ENGINE

BACKGROUND OF THE INVENTION

When a V-engine is designed, all of its parts are proportioned and arranged so that the engine functions efficiently, and so that all of the parts, including the block, the heads and the intake manifold seal properly. However, when V-engines are refinished, as by grinding surfaces of the block and heads, the precisely determined relationships of the parts of the original engine may be altered. If that occurs and the designed relationships between the parts are not reestablished, leaks can occur and the engine can be damaged and its performance will deteriorate.

Leakage is an even more serious problem in engines used in racing vehicles, where dimensional relationships are critical and where any deterioration in operating characteristics and performance is obviously unacceptable.

Accordingly it has long been known that great care must be taken in refinishing the mating surfaces of heads and blocks of V-engines, and great effort goes into reestablishing original equipment conditions (or specially modified conditions), especially when racing V-engines are refinished.

If would be desirable to provide an improved method as well as easily used gauges for insuring that desired original relationships can be reestablished for a V-engine after it has been reassembled.

SUMMARY OF THE INVENTION

In accordance with the present invention, a gauge is provided for determining the correctness of the angular orientations of a pair of elongated heads secured to an elongated V-block automobile engine in preparation for the securance of an intake manifold to the heads, the heads and manifold defining confronting flat land areas which define aligned openings therein, the land areas comprising sealing surfaces. The gauge comprises a first central section having a length less than the distance between the heads, and has a first diverging leg projecting outwardly in a first direction from one end of the central section at a first precise angle and a second diverging leg projecting outwardly in a second direction from the second end of the central section at a second precise angle, each of the first and second legs defining expansive outer surfaces which are flat and which are adapted to be seated on the flat land areas of the heads while suspending the central section below the heads. When the flat expansive outer surfaces lie substantially parallel to the flat land areas of both of heads at a plurality of locations along the lengths of the heads, the gauge signifies that the head sealing surfaces are correctly oriented for securance of an intake manifold thereto. In one form the first and second angles are identical.

The invention also contemplates a method for determining the correctness of the angular orientations of the finished surfaces of a pair of elongated heads secured to an elongated V-block prior to securance of an intake manifold to the heads, and wherein the heads have surfaces including flat land areas for confronting flat manifold land areas, the land area of one head lying in a first plane and the land area of the other head lying in a second plane which intersects the first plane at an angle, the method comprising the steps of providing a generally V-shaped gauge which in plan view has a central section, a first leg having a first outer surface and a second leg having a second outer surface, the outer surfaces lying in planes which intersect at substantially the very same angle at which the first and second planes of the land areas of the heads are designed to intersect, disposing the gauge outer surfaces against first and second head land areas to determine the degree of parallelism between the gauge leg outer surfaces and the confronting head land areas, thereby to determine whether the head surfaces are correctly oriented relative to each other, then repeating the disposing step at a plurality of longitudinal locations along the longitudinal length of the head land areas to determine whether the head surfaces are correctly oriented relative to each other at that plurality of longitudinal locations.

Further objects, features and advantages of the present invention will become apparent from the following description and drawings.

BRIEF DESCRIPTION OF THE DRAWINGS

FIG. 1 is a perspective view of a V-engine, including the block and a pair of heads mounted thereto;

FIG. 2 is an end view of the manifold for the V-engine of FIG. 1;

FIG. 3 is a perspective view like that of FIG. 1, but showing a gauge of the present invention positioned for evaluating the correctness of the relationship of the surfaces of the heads;

DETAILED DESCRIPTION

Figure 8:
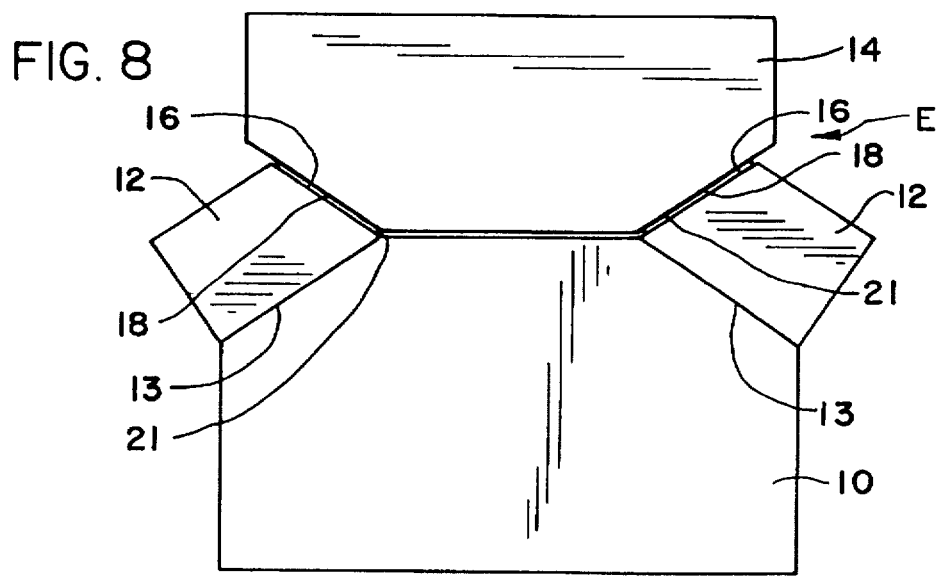
FIG. 8 is a view is like that of FIG. 6, but of a manifold and the heads and blocks of a correctly refinished V-engine, illustrating how such an assembly would look when assembled.

Referring now to the drawings, the parts of a typical V-engine with which the gauge and method of the present invention may be used are shown in FIGS. 1–3. V-engine E may comprise a block 10 and a pair of heads 12. Heads 12 define lower surfaces 13 which mate with confronting surfaces of the block, between which appropriate head gaskets are positioned, and upper surfaces 16 which mate with confronting surfaces 18 of the intake manifold 14. Again, appropriate manifold gaskets 21 are provided between the confronting surfaces 16, 18. (FIG. 8)

Figure 7:
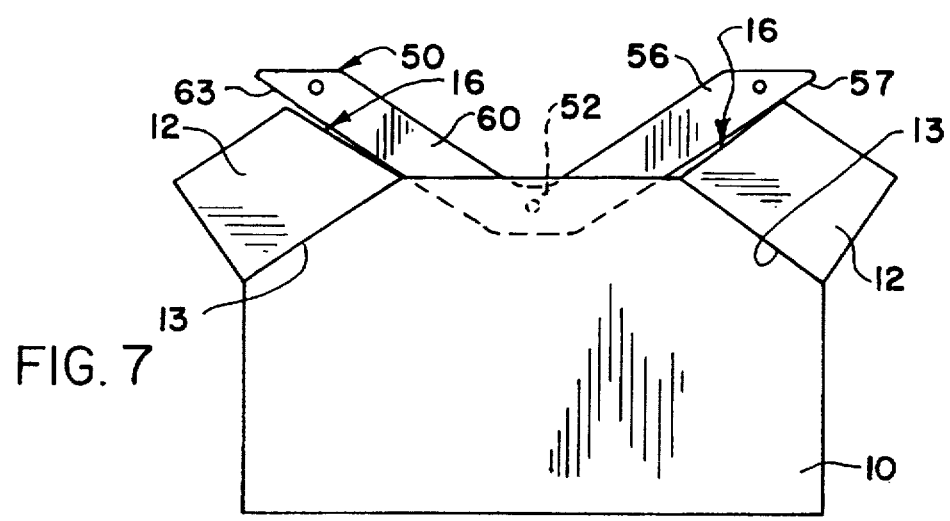
FIG. 7 is an end view which is illustrative of the heads and block of an incorrectly refinished V-engine as shown by the gauge of FIG. 4 juxtaposed therewith.

In particular the upper head surfaces 16 have land areas 17 which confront corresponding land areas 19 of the confronting manifold surfaces 18. It is these land areas 17, 19 which define aligned openings and which are sealed by manifold gaskets 21 which lie against and between the confronting land areas. It will be appreciated that the confronting land areas 17, 19 should be close to parallel or parallel to each other for effective sealing by conventional flat manifold gaskets 21. If the land areas are not close to parallel (as schematically illustrated by FIG. 7) then the sealing stresses will not be appropriate, and leakage can occur. It is for that reason that the land areas 17, 19 of confronting sealing surfaces 16, 18 should be generally parallel, and it is for that same reason that the refinishing process for the sealing surfaces of the heads 12 should reestablish the original orientations of the head surfaces.

The confronting land areas of the head and manifold may be designed to be exactly parallel or very close to parallel.

As such they are designed to be close to parallel and may be referred to as generally parallel.

For example in the case of the small block Chevrolet V-8 engine, there is an outwardly diverging 20 minute interference angle (per side) between the head and the manifold. That means that the manifold 14 tends to fit tighter at the floor of the intake ports. Some refinishers machine the heads and manifolds to have the land areas parallel, while others use interference fits of 10 minutes. All of these which seek to substantially reestablish a desired original equipment relationship will be referred to herein as substantially or generally parallel.

Thus, it is important to make certain that the angular orientation of the plane of the land area 17 of the first head surface 16 and the angular orientation of the plane of the land area 17 of the second head surface 16 are reestablished so that the angle of intersection of those planes is the same as the original design specified.

When an V-engine E is to be refinished, the surfaces 16 are typically ground to reestablish effective land areas 17 or sealing surfaces. During regrinding (as is the case also if the land areas 19 of the confronting manifold surfaces 18 are reground) the angular relationships of the surfaces 16 are sometimes altered. If there is any change in the lower surfaces 13 of the heads or the confronting block surface, a change in the angular orientations of the surfaces 16 could also result when the heads 12 are clamped to the block 10. In any event, because the angular relationship of the surfaces 16 is frequently altered during regrinding and refinishing, the desired generally parallel relationships between the respective pairs of head and manifold surfaces may also change. If this occurs, then the interposed manifold gaskets 21 will fail to seal effectively, and the engine assembly may leak, producing the undesirable results referred to above.

In accordance with the present invention, a gauge 50 is provided. Gauge 50 is specifically designed and proportioned for each particular V-engine for which it may be desirable to provide for accurate reassembly. There are several V-engines which are in widespread use. The engine having the greatest currency is the small block Chevrolet V-8 engine. For this engine, a gauge having the general configuration and dimensions shown in the drawings, and in particular the angles A, will make it possible to substantially reestablish the relationship between the manifold 14 and heads 12 as determined by the original equipment manufacturer.

Figure 4:
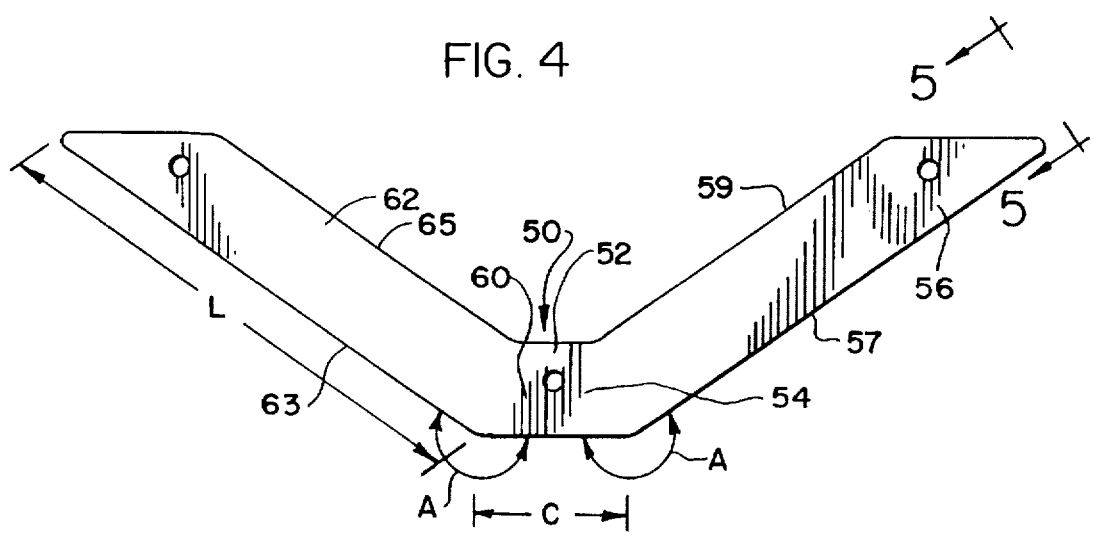
FIG. 4 is a side elevational view of the gauge of FIG. 3.
Figure 5:
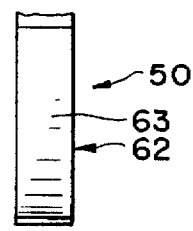
FIG. 5 is an end view of the gauge as shown in FIG. 4.

As best seen in FIGS. 3 to 5, gauge 50, in plan view (FIG. 4), has a central section 52 having a length less than the distance between the heads 12. At a first end 54 of central section 52, a first leg 56 projects outwardly and at an angle A thereto. At the second opposite end 60, a second leg 62 projects outwardly and diverges at an angle A thereto. As seen in FIG. 5, the gauge 50 has a substantial thickness in end elevation. Each leg 56, 62 provides an expansive, elongated outer flat surface 57, 63, respectively. The angles A at which the legs 56, 62 diverge, hence the angles A at which surfaces 57, 63 diverge, are precisely determined for each particular engine. In the case of the small block Chevrolet V-8 engine, the manifold land area angle A used is the 145.10°. This means that the head land area is preferably at an angle of 35° to provide the 0.10° interference fit per side (about 5 minutes per side). The surfaces 57, 63 thus lie in planes which intersect at the generally same angle in which the planes of the head land areas 17 were designed to intersect, and therefore lie substantially parallel to the planes of the land areas 19 of the manifold surfaces 18.

Figure 6:
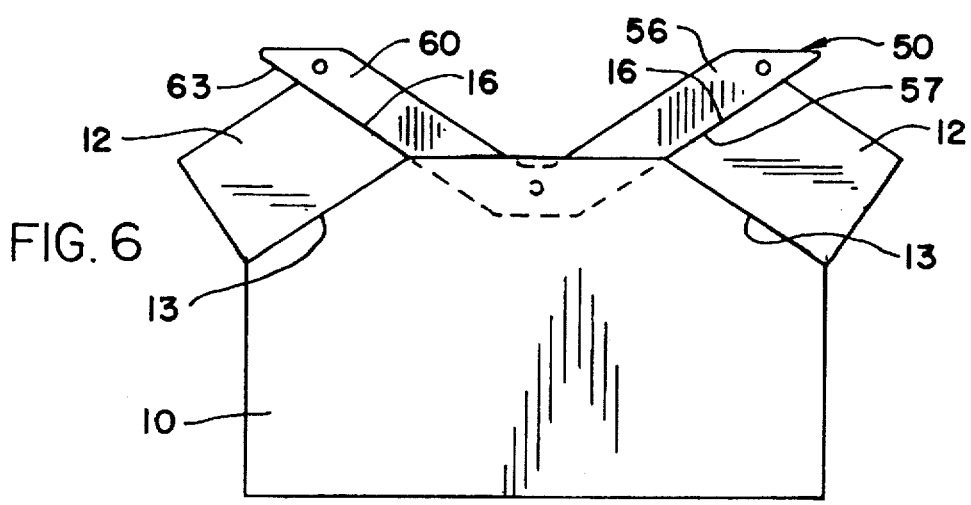
FIG. 6 is an end view which is illustrative of the heads and block of a correctly refinished V-engine as shown by the gauge of FIG. 4 juxtaposed therewith.

When the engine E is to be reassembled, the heads are first bolted to the block with the appropriate head gaskets in place therebetween. Gauge 50 is then suspended or positioned with its surfaces 57, 63 against the head land areas 17 at a series of spaced locations along the length of the engine. If the confronting gauge surfaces and land areas (57, 17 and 63, 17) are sufficiently parallel so that a selected shim (such as a shim which is 0.001 inch thick) cannot pass between them at the outer regions of the heads, then the gauge will have established that the head surfaces 16 are appropriate for creating an effective seal with the manifold 14 and an associated gasket 21. Such a satisfactory relationship is shown in FIGS. 5, 6 and 8. An unsatisfactory relationship is schematically illustrated in FIG. 7, where one head surface 16 is not generally parallel and therefore diverges unacceptably from the surface 63 of gauge 50 on one side and on the other side converges rather than diverges outwardly, also an unacceptable condition.

To establish that the heads have been satisfactorily refinished and reassembled to the block, the gauge 50 is first suspended at a first longitudinal location against the head land areas 17 and with the first leg flat surface 57 against the first head 12 and the second leg flat surface 63 against the second head 12. With one of the gauge leg surfaces and heads in close flat contact, it is then determined whether the other gauge leg surface and head land area are closely or substantially parallel or whether there is an unacceptable divergence in parallelism at that longitudinal location. The gauge is similarly suspended at other longitudinal spaced locations, and like determinations are made at those other locations, thereby to ascertain whether the orientations of the head surfaces 16 and their land areas 17 have been satisfactorily reestablished.

In one form of the invention, a gauge 50 is desirably formed from a dimensionally stable material such as aluminum. The gauge may be cut from a plate with the precise angular relationships described. The plate may be one-half inch thick to provide leg surfaces 57, 63 which are expansive and sufficiently wide and broad to be able to be seated stably on the confronting head land areas 17 when the gauge is suspended on the head surfaces 16. The central section 52 (shown as length C in FIG. 4) may be about 2 inches long. Legs 56, 62 (shown as length L in FIG. 4) may each be 7.5 inches long. The relationship of the legs to the length of the central section 52 assures that the leg surfaces preferably confront the head surfaces 16 and associated head land areas along the entire vertical lengths of the head surfaces 16. To assure that, the depending central section 52 extends below the head surfaces 16, as is illustrated by FIGS. 6 and 7.

Like gauges for other engines, such as the big block Chevrolet V-8 engine and the small block Ford V-8 engine, among others, may be made as well. The dimensions and angles of the legs will be determined from the original manufacturer's specifications and in accordance with the structural relationships as described herein.

It will be apparent that the gauge 50 may also be used to evaluate the correctness of the angular relationship between the manifold land areas 19. To that end the legs 56, 62 may have inner surfaces 59, 65 which are parallel, respectively, to the manifold land surfaces 19. In this case, surfaces 59, 65 may be at angles of 145.10°, whereas surfaces 56, 62 lie at angles of 145.0°.

By positioning the surfaces 59, 65 against the land areas 19 of manifold 14 (as illustrated by FIG. 2) at several locations along the length of the manifold, it can be determined whether the manifold has retained the original angular relationship of the land areas 19 or, if machined (which occasionally occurs), the machining has altered the relationship to a point where further remachining is necessary.

It will be apparent to those skilled in the art that modifications and changes may be made without departing from the scope and spirit of the invention. Accordingly it is intended that the invention is not be limited, except as may be necessary in view of the appended claims.

What is claimed is:

1. A gauge for determining correctness of angular orientations of a pair of elongated heads secured to an elongated V-block automobile engine in preparation for securance of an intake manifold to the heads, said heads and intake manifold defining confronting flat land areas which define aligned openings therein, said land areas comprising sealing surfaces, said gauge comprising a first central section having a length less than the distance between the heads, and having a first diverging leg projecting outwardly in a first direction from one end of said central section at a first precise angle and a second diverging leg projecting outwardly in a second direction from a second end of said central section at a second precise angle, each of said first and second legs defining expansive outer surfaces which are flat and which are adapted to be seated on said flat land areas of said heads while suspending said central section below said heads, and wherein when the flat expansive outer surfaces lie generally parallel to the flat land areas of both of said heads at a plurality of locations along the lengths of said heads, the gauge signifies that the head sealing surfaces are correctly oriented for securance of an intake manifold thereto.

2. A gauge in accordance with claim 1, and wherein said first and second angles are identical.

3. A method for determining correctness of angular orientations of finished surfaces of a pair of elongated heads secured to an elongated V-block prior to securance of an intake manifold to the heads, and wherein said heads and said intake manifold define aligned openings and wherein said heads have flat land areas for confronting flat manifold land areas which are adapted to be sealed with gaskets to be disposed therebetween, the land area of one head lying in a first plane and the land area of the other head lying in a second plane which intersects the first plane at an angle, the method comprising the steps of:

providing a gauge which in plan view has a central section, a first leg and a second leg, said first and second legs projecting outwardly from opposite ends of said central section at precise divergent angles, each of said first and second legs having an expansive, elongated flat outer surface, and surfaces lying in planes which intersect at substantially the very same angle at which the first and second planes of the land areas of the heads are designed to intersect, suspending said gauge at a first longitudinal location against the head land areas with the first leg flat outer surface against the first head land area and with said the second leg flat outer surface against the second head land area to determine whether said first and second leg flat outer surfaces lie substantially parallel to the head land areas or whether when one leg flat outer surface and a said head land area are generally parallel there is a divergence in substantial parallelism between the other leg outer flat surface and its confronting head land area, thereby to determine whether the head surfaces are correctly oriented relative to each other at that longitudinal location, and repeating said suspending step at a plurality of longitudinal locations along the longitudinal length of said head land areas to determine whether the head surfaces are correctly oriented relative to each other at each of that plurality of locations.

4. A method for determining correctness of angular orientations of finished surfaces of a pair of elongated heads secured to an elongated V-block prior to securance of an intake manifold to the heads, and wherein said heads have surfaces including flat land areas for confronting flat manifold land areas, the land area of one head lying in a first plane and the land area of the other head lying in a second plane which intersects the first plane at an angle, the method comprising the steps of:

providing a generally V-shaped gauge which in plan view has a central section, a first leg having a first outer surface and a second leg having a second outer surface, said outer surfaces lying in planes which intersect at substantially the very same angle at which the first and second planes of the land areas of the heads are designed to intersect, disposing the gauge outer surfaces against first and second head land areas to determine the degree of parallelism between the gauge leg outer surfaces and the confronting head land areas, thereby to determine whether the head surfaces are correctly oriented relative to each other, and repeating said disposing step at a plurality of longitudinal locations along the longitudinal length of said head land areas to determine whether the head surfaces are correctly oriented relative to each other at that plurality of longitudinal locations.

* * * * *

UNITED STATES PATENT AND TRADEMARK OFFICE
CERTIFICATE OF CORRECTION

PATENT NO. : 5,801,303
DATED : September 1, 1998
INVENTOR(S) : Gerald A. Rosenquist It is certified that error appears in the above-identified patent and that said Letters Patent is hereby corrected as shown below:

In claim 3, line 23, please delete "said".

Signed and Sealed this

Twenty-seventh Day of February, 2001

Attest:

NICHOLAS P. GODICI

*Attesting Officer*  *Acting Director of the United States Patent and Trademark Office*